(12) United States Patent
King et al.

(10) Patent No.: US 8,600,837 B2
(45) Date of Patent: Dec. 3, 2013

(54) METHOD AND SYSTEM FOR RANKING INFORMATION ITEMS FOR DISPLAY

(75) Inventors: Guy Phillip William King, Prahran (AU); Clark Guo, Providence, RI (US)

(73) Assignee: RETAILMENOT, Inc., Austin, TX (US)

( * ) Notice: Subject to any disclaimer, the term of this patent is extended or adjusted under 35 U.S.C. 154(b) by 681 days.

(21) Appl. No.: 12/554,350

(22) Filed: Sep. 4, 2009

(65) Prior Publication Data

US 2011/0060659 A1    Mar. 10, 2011

(51) Int. Cl.
*G06Q 30/00*    (2012.01)

(52) U.S. Cl.
USPC ....... 705/27.1; 705/26.1; 705/26.7; 705/14.2; 705/14.23

(58) Field of Classification Search
USPC ............. 705/26, 26.1–27.2, 14.1–14.73
See application file for complete search history.

(56) References Cited

U.S. PATENT DOCUMENTS

| | | | |
|---|---|---|---|
| 5,855,007 A | 12/1998 | Jovicic | |
| 7,672,868 B1 * | 3/2010 | Keller et al. | 705/10 |
| 2006/0015378 A1 * | 1/2006 | Mirrashidi et al. | 705/7 |

OTHER PUBLICATIONS

Hubner, A., Lenz, m., Borch, R., & Posthoff, M. (2000). Last-minute travel application. AI Magazine, 21(4), 58.*

* cited by examiner

*Primary Examiner* — Resha Desai
(74) *Attorney, Agent, or Firm* — Bracewell & Giuliani, LLP

(57) ABSTRACT

A method of displaying information items, the method comprising: determining a ranking score for each of a plurality of information items based on a history of votes received for each of the information items, the determining comprising: assigning a value to the information item for each vote received in respect of that information item, assigning a weight to each value as a function of the recency of the vote, and calculating a score for each information item, the score being calculated as a first sum across all votes of the product of the value of each vote with its assigned weight, divided by a second sum of the weights across all votes; determining, responsive to a first serve request and based on at least one criterion, at least one of the information items to be displayed at a client device; and transmitting to the client device code executable by a browser application to display the at least one information item based on the ranking score.

25 Claims, 8 Drawing Sheets

METHOD AND SYSTEM FOR RANKING INFORMATION ITEMS FOR DISPLAY

TECHNICAL FIELD

The described embodiments relate generally to methods and systems for ranking information items for display. Particular embodiments involve display of information items on a website according to a ranking determined for each of the items based on feedback input received in relation to the items.

BACKGROUND

Coupons can be used as a form of information item to induce a potential customer to purchase a product or service. For example, the information item may be framed as a promotional offer that involves providing a product or service at a discounted price and this can be represented in the form of a coupon having a coupon code. The coupon code may be used by the entity making the promotional offer to validate the coupon.

Some coupons may be made available on a website, from which the coupons may be printed for physical presentation of the coupon at a retail establishment or, in some instances, for presentation when making an online purchase of a product or service to which the coupon applies.

In displaying information items on a website, users navigating to the site may enjoy a better user experience if they are able to view information items for which the reliability or efficacy has had some previous endorsement, either in the positive or negative sense.

SUMMARY

Some embodiments relate to a method of displaying information items, the method comprising:
determining a ranking score for each of a plurality of information items based on a history of positive or negative votes received for each of the information items, the determining comprising:
    assigning a positive or negative value to the information item for each respective positive or negative vote,
    assigning a weight to each positive or negative value as a function of the recency of the respective positive or negative vote, and
    calculating a score for each information item, the score being calculated as a first sum across all votes of the product of the value of each vote with its assigned weight, divided by a second sum of the weights across all votes;
determining, responsive to a first serve request and based on at least one criterion, at least one of the information items to be displayed at a client device; and
transmitting to the client device code executable by a browser application to display the at least one information item based on the ranking score.

In some embodiments, the information items may comprise promotional offers and/or shopping tips. Determining the ranking score may comprise determining the ranking score based on the score of each information item and the number of votes received for that information item. The ranking score may be based on a product of the score of each information item with the number of votes received for that information item. The recency may be determined according to a time elapsed since the vote was received. The recency may be determined according to a relative chronological order in which votes are received.

According to some embodiments, the method may further comprise receiving voting information for each received vote and storing in a database voting data based on the voting information in a data record associated with the information item. The voting data may comprise for each vote a Boolean value and a date and time at which the vote was received. The determining a display ranking may be performed at regular intervals. The determining a display ranking may comprise assigning a neutral, mean or median ranking score to each promotional offer that has not received any votes.

According to some embodiments, the at least one criterion may comprise a criterion or selection input received from the client device with the first serve request. The at least one criterion may comprise a default display criterion.

The method may further comprise receiving at a server system associated with a host site a second serve request indicating a first uniform resource locator (URL) unique to one information item described in the code transmitted to the client device, and may further comprise automatically redirecting the second serve request to a second URL associated with a subject party of the one information item, the second URL being unique to the host site and the subject party. The method may further comprise performing a look-up based on the first URL to determine the second URL and storing a record of the receiving of the second serve request.

The determining a display ranking may further comprise applying a predetermined adjustment factor to determine the weighting to be assigned to each value. The adjustment factor may be configurable to increase or reduce the effect that recency has on the weights assigned to the values. The assigned weighting for each value may be proportional to the recency of the vote.

According to some embodiments, the assigned weight may be calculated according to $$\text{Weight}(i, k) = \frac{1}{2^{Age(i,k)/AdjFactor}}$$

Where:
Weight(i,k) is the weight assigned to vote i for information item k,
Age(i,k) is an aging function of vote i for information item k, and
AdjFactor is a constant.

The ageing function may be a number of time units since vote i was received for information item k. The ageing function may be inversely proportional to the chronological order in which vote i was received for information item k, wherein the ageing function assigns to a most recent vote a lowest value and assigns to an oldest vote a highest value. The positive value and the negative value may have a same magnitude.

According to some embodiments, the score may be calculated according to the formula:

$$\text{Score}(k) = \frac{1}{A(k)} \sum_{i=1}^{N(k)} \text{Weight}(i, k) * \text{Value}(i, k)$$

$$A(k) = \sum_{i=1}^{N} \text{Weight}(i, k)$$

Where:

Score(k) is the score assigned to information item k,

Weight(i,k) is the weight assigned to vote i for information item k,

Value(i,k) is an assigned value of vote i for information item k, and

N(k) is the number of votes received for information item k.

The ranking score for each information item may be the score calculated for that information item. The ranking score for each information item may be the product of the number of votes received for that information item with the score calculated for that information item.

Some embodiments relate to a method of displaying information items, the method comprising:

determining a ranking score for each of a plurality of information items based on a history of votes received for each of the information items, the determining comprising:

assigning a value to the information item for each vote received in respect of that information item, assigning a weight to each value as a function of the recency of the vote, and calculating a score for each information item, the score being calculated as a first sum across all votes of the product of the value of each vote with its assigned weight, divided by a second sum of the weights across all votes;

determining, responsive to a first serve request and based on at least one criterion, at least one of the information items to be displayed at a client device; and transmitting to the client device code executable by a browser application to display the at least one information item based on the ranking score.

Some embodiments relate to computer-readable storage storing executable program code which, when executed by at least one computing system, causes the at least one computing system to perform a process comprising:

determining a ranking score for each of a plurality of information items may be based on a history of positive or negative votes received for each of the information items, the determining comprising:

assigning a positive or negative value to the information item for each respective positive or negative vote, assigning a weight to each positive or negative value as a function of the recency of the respective positive or negative vote, and calculating a score for each information item, the score being calculated as a first sum across all votes of the product of the value of each vote with its assigned weight, divided by a second sum of the weights across all votes;

determining, responsive to a first serve request and based on at least one criterion, at least one of the information items to be displayed at a client device; and transmitting to the client device code executable by a browser application to display the at least one information item based on the ranking score.

Some embodiments relate to a server system comprising:

at least one processing device; and computer-readable storage storing executable instructions which, when executed by the at least one processing device, cause the server system to perform acts of:

determining a ranking score for each of a plurality of information items based on a history of positive or negative votes received for each of the information items, the determining comprising:

assigning a positive or negative value to the information item for each respective positive or negative vote, assigning a weight to each positive or negative value as a function of the recency of the respective positive or negative vote, and calculating a score for each information item, the score being calculated as a first sum across all votes of the product of the value of each vote with its assigned weight, divided by a second sum of the weights across all votes;

determining, responsive to a first serve request and based on at least one criterion, at least one of the information items to be displayed at a client device; and transmitting to the client device code executable by a browser application to display the at least one information item based on the ranking score.

BRIEF DESCRIPTION OF THE DRAWINGS

Embodiments are described in further detail below, by way of example, with reference to the accompanying drawings, in which.

DETAILED DESCRIPTION

Described embodiments relate generally to methods and systems for displaying information items that may facilitate access to one or more promotional offers. An information item may be one of many provided on a website that specialises in making large numbers of promotional offers available to consumers to redeem at many different retailers. The promotional offers may be presented in the form of a coupon, for example. In other embodiments, the information items may relate to plug-ins, updates or patches for computer security software, for example. However, for convenient illustration, examples are described herein in relation to embodiments relating to promotional offers and shopping tips.

A user may navigate to a coupon-sharing website, for example, where promotional offers in the form of coupons from many different retailers or service providers may be displayed and searched. Although it is common to describe web pages as being displayed on a website, the actual display occurs using a browser application on a client computing device that receives code from a web server hosting the website in response to a serve request for a web "page". The code thus received by the client computing device is then executed by the browser application, if possible, to display the requested web page. It is in this context that embodiments are further described.

Figure 1:
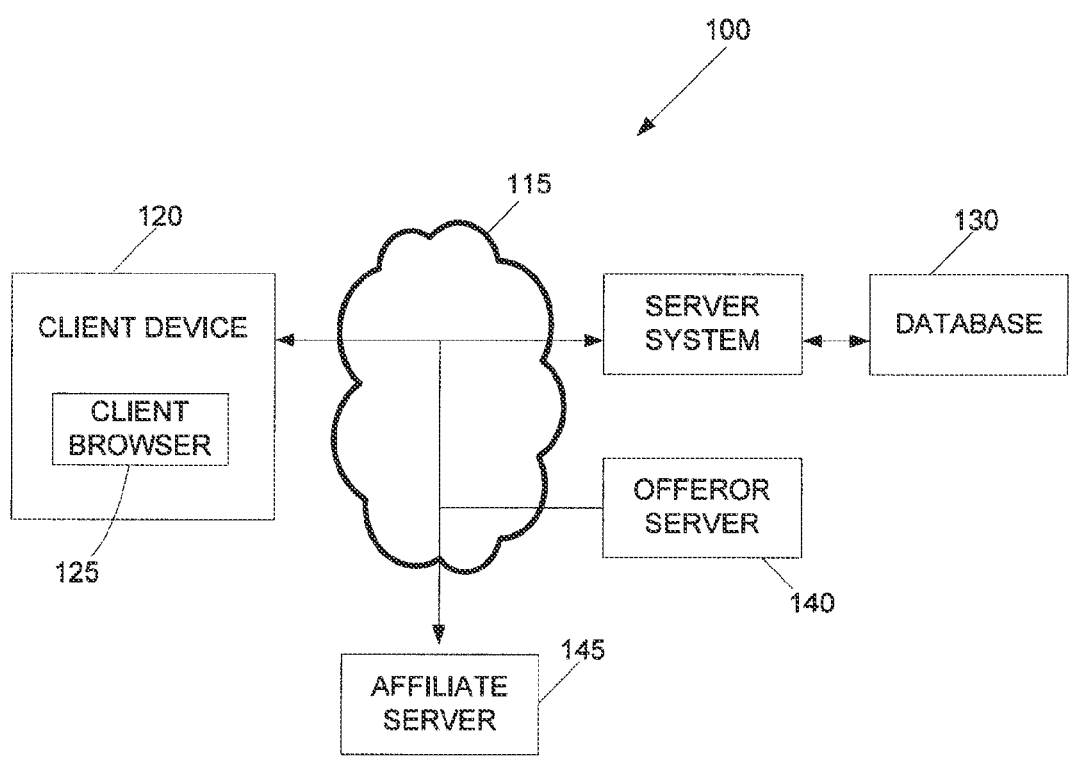
FIG. 1 is a block diagram of an example client-server architecture.
Figure 2:
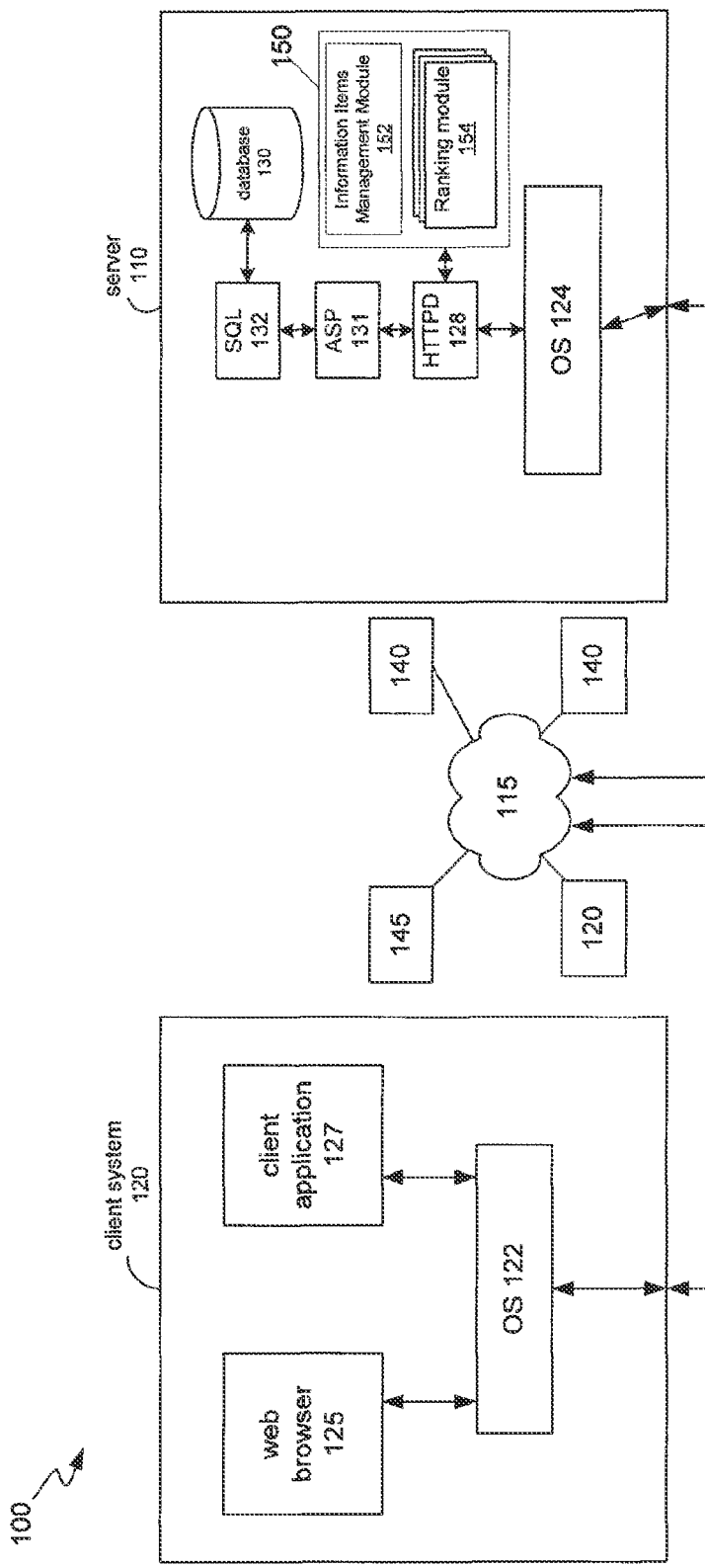
FIG. 2 is a block diagram showing aspects of the client-server architecture in further detail.
Figure 3:
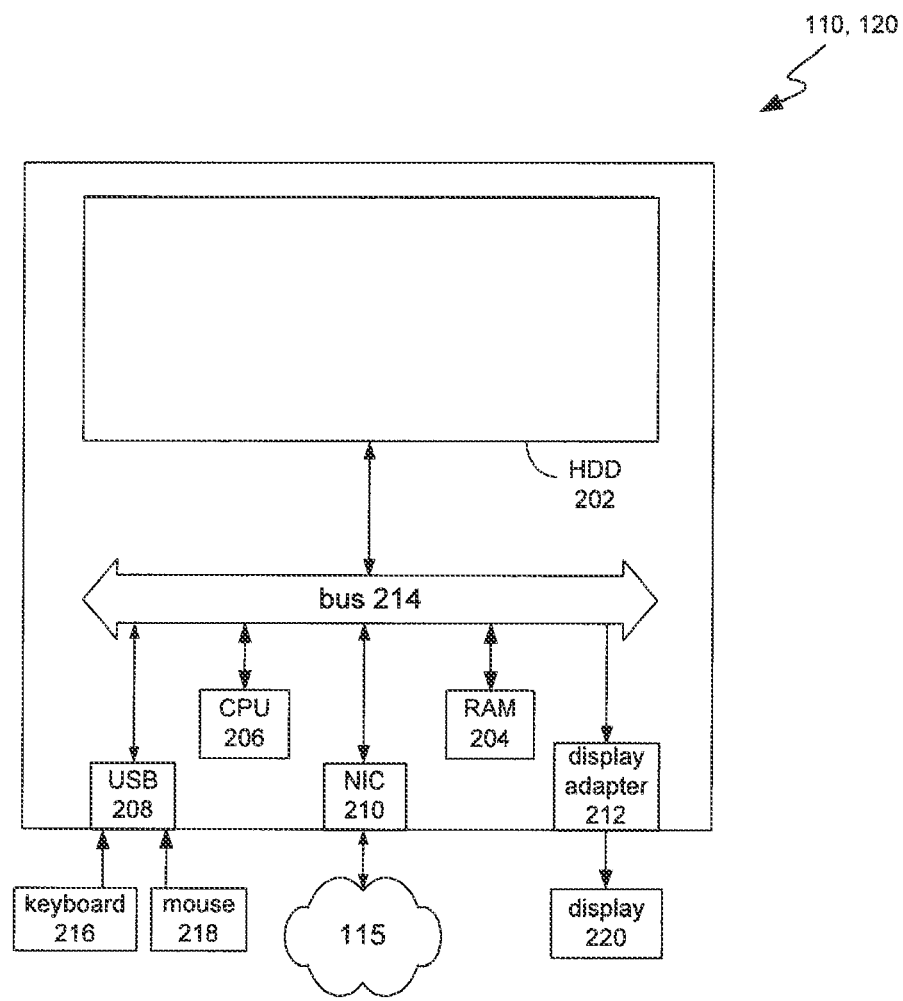
FIG. 3 is a block diagram of an example computing device.

Referring generally to FIG. 1, a system 100 for facilitating access to information items, such as a promotional offer or shopping tip, is described in further detail. Aspects of system 100 are also shown and described by way of example with reference to FIGS. 2 and 3. System 100 comprises a server system 110 and a client computing device 120 in communication with each other over a network 115, such as the Internet. System 100 further comprises a database 130 accessible to server system 110 for storing data pertinent to operation of server system 110 and provision of service to client computing device 120. System 100 further comprises an offeror server 140 and an affiliate server 145 in communication with server system 110 and client computing device 120 over network 115.

Client computing device 120 may comprise a desktop, mobile or handheld computing device having at least one processor (e.g. CPU 206), one or more forms of memory 202, 204, an operating system 122 and a user interface. The memory may comprise volatile (e.g. RAM 204) and non-volatile (e.g. hard disk drive 202, solid state drive, Flash memory and/or optical disc) storage. The user interface may comprise a display 220 and at least one input device, such as a touch-screen, a keyboard 216, mouse 218, stylus or other peripheral device that can be used for providing user input to client computing device 120.

A number of software applications or applets may be executing or executable by the at least one processor to perform various device-related functions. Such applications may be stored in the non-volatile memory 202 of computing device 120. At least one such software application includes a browser application 125 for enabling a user to navigate to sites accessible over the network 115 to receive content therefrom. Other client software applications 127 may execute on client system 120 using operating system 122.

Figure 6:
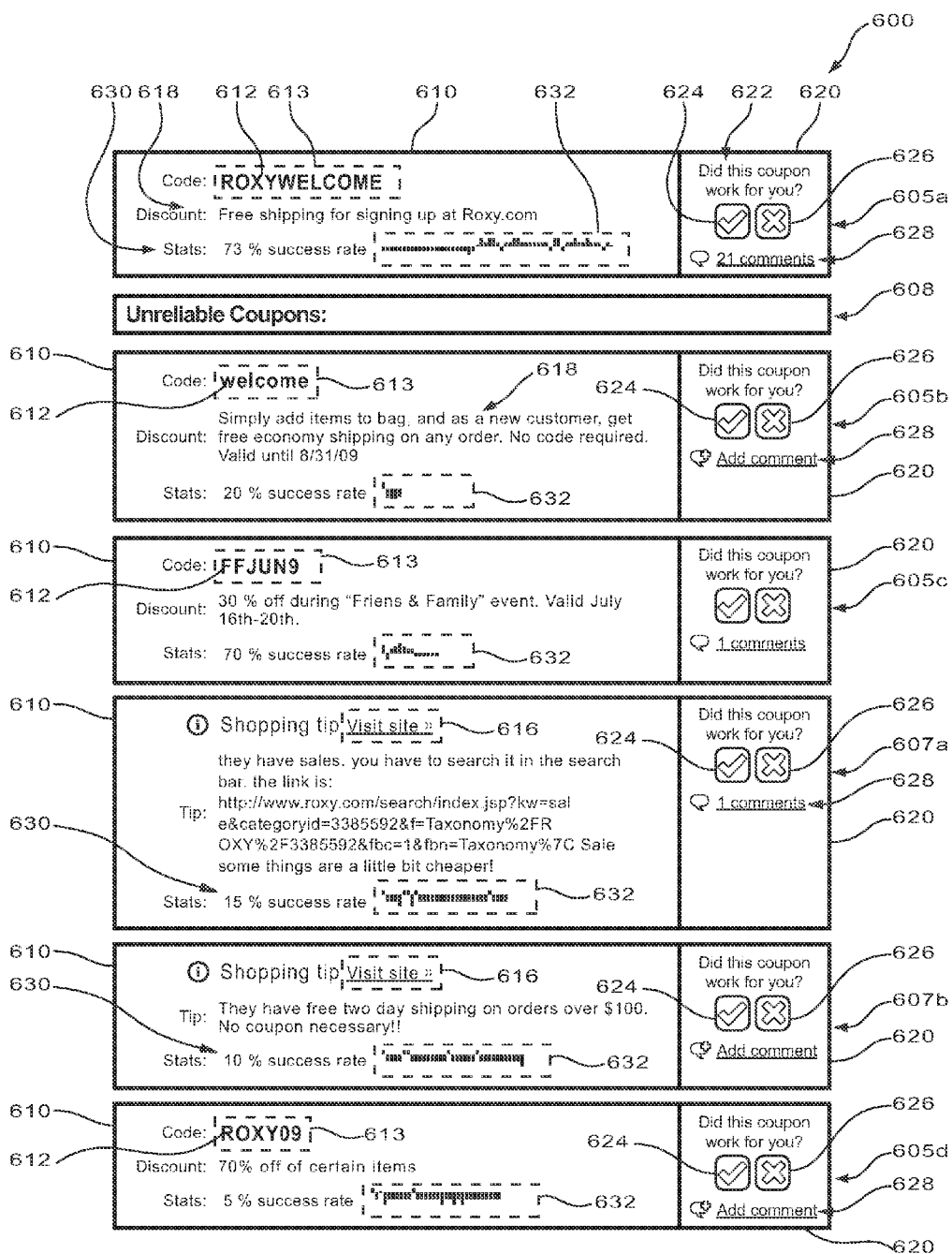
FIG. 6 is an example display of information items according to some embodiments.
Figure 7:
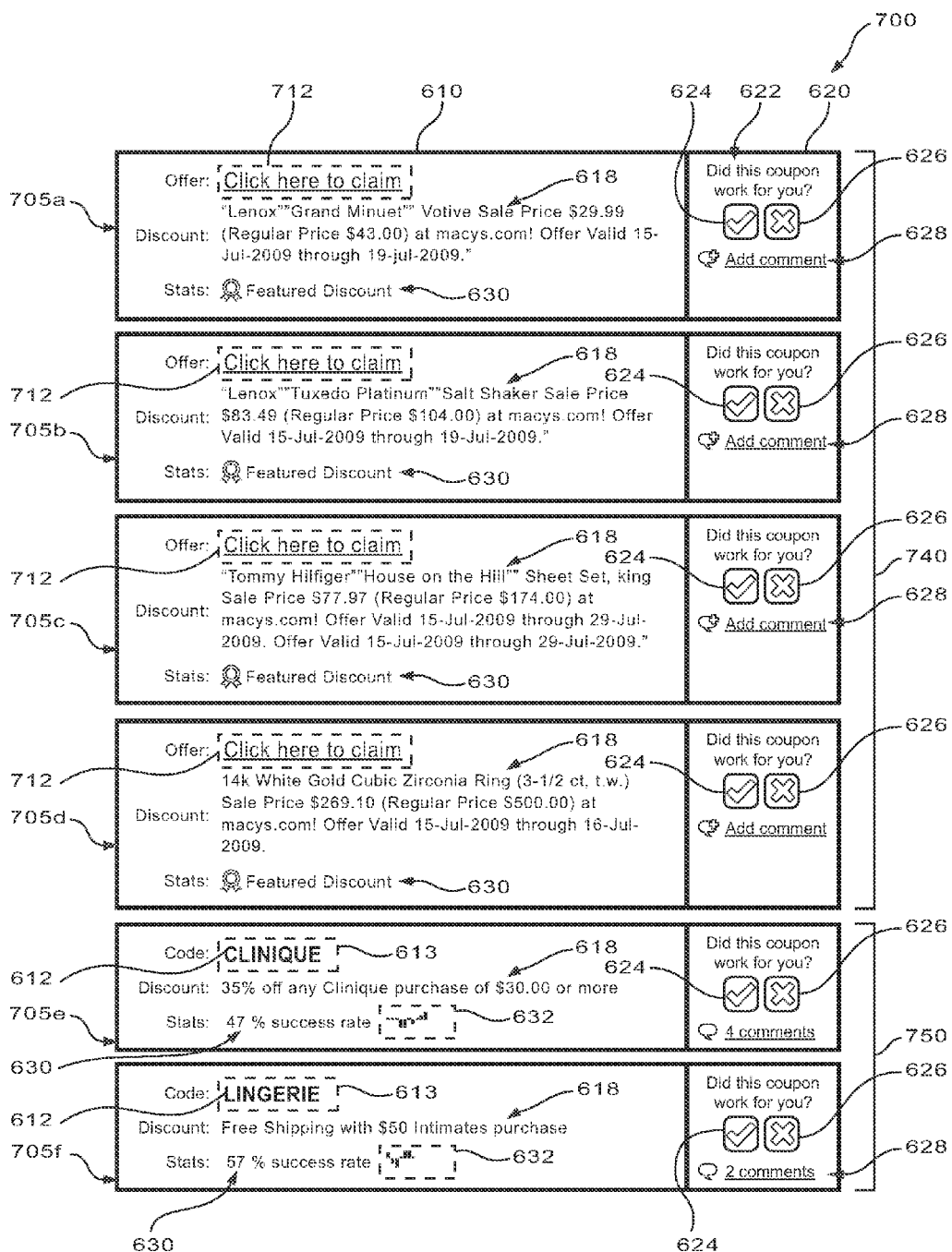
FIG. 7 is an example display of information items according to some embodiments.
Figure 8:
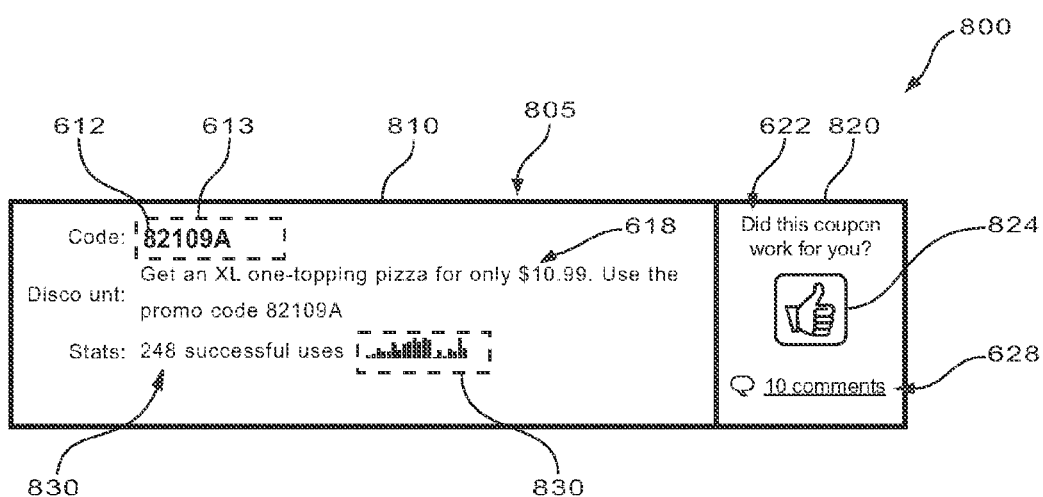
FIG. 8 is an example display of an information item according to some embodiments.

In the example of system 100 illustrated in FIG. 1, client browser 125 can be used to communicate with server system 110 to request content therefrom, in the form of one or more web pages provided as program code executable by the browser application 125. According to some embodiments, server system 110 is configured to provide at least one promotional offer, and more likely many such promotional offers, for consideration by a user viewing web pages via browser application 125. Thus, server system 110 may support or act as a coupon sharing site. FIGS. 6, 7 and 8 illustrate example displays 600, 700 and 800 of promotional offers and shopping tips displayable by browser application 125 according to code received from server system 110.

Server system 110 may display (or have accessible for display) a large number of promotional offers, shopping tips or other information items, one or more of which may be offered by or associated with a product or service provider or an onseller or reseller (i.e. as a subject party of the information item) of such products or services (i.e. a retailer), termed herein for convenience as the "offeror". The offeror server 140 may thus comprise a web server hosted by or on behalf of the offeror and making available web pages associated with the product or service to which the promotional offer or other information item (viewable by the user by accessing server system 110) relates. The promotional offer may thus be used as a means of, among other things, increasing traffic to the offeror server 140, promoting the product or service to encourage purchase thereof or for establishing some form of relationship between the offeror and the user as a consumer.

Server system 110 comprises at least one processing device, and may comprise multiple processing devices operating in cooperation and/or parallel to operate web server functions 128 (e.g. using a hypertext transfer protocol daemon (HTTPD)), data processing functions and data storage and retrieval functions (e.g. using structured query language (SQL) support 132) in conjunction with database 130. Server system 110 may also comprise scripting language support 131, such as Microsoft™ ASP, ASP.NET or PHP. Server system 110 may comprise or have access to suitable non-volatile data storage separate to database 130 for storing executable program code to enable server system 110 to perform its functions, including those functions described herein. Such program code comprises an operating system 124 and an information item offer management module 152 (as one of a number of software modules 150) for managing processing and communications functions in relation to the information items. Software modules 150 further comprise a ranking module 154 for determining a display ranking of the information items. Offeror server 140 and affiliate server may comprise a similar architecture and similar server-related functions to server system 110, except that they will not have access to database 130.

Database 130 may comprise a localised or distributed database storing data records for the various information items, as well as user feedback (if any) received in relation to each information item. The time and date of user feedback received, for example in the form of positive or negative votes as to the efficacy or the redeemability of a promotional offer and any received user comments, is also stored in database 130. Database 130 may also be used by server system 110 to store data regarding the number of times an information item is selected and stores data for the purpose of rating or ranking the various information items according to user feedback and/or other measures of efficacy, veracity or reliability of the promotional offers or other information items.

The affiliate server 145 may be hosted by or associated with an entity that tracks traffic and transactions to invoice the offeror and compensate the entity that operates server system 110 for sales that resulted from traffic referred through server system 110. For example, the entity hosting or associated with affiliate server 145 may be Commission Junction (www.cj.com), which provides affiliate marketing.

Referring in particular to FIG. 6, the example display 600 of a series of promotional offers 605 and shopping tips 607 (as example forms of information items) is described in further detail. Display 600 comprises a series of promotional offers 605 and shopping tips 607 on a single page displayed using HTML and other program code executed by browser application 125. Each promotional offer 605a, 605b, 605c and 605d and shopping tip 607a, 607b comprises a display portion 610 and a feedback portion 620. The display portion 610 may comprise a promotional code 612, also referred to as a coupon code, and a description 618 of the promotion. The display portion 610 further comprises a statistical information display section 630 that provides information regarding the efficacy of the promotional offer 605 or shopping tip 607, for example including user success rate, user perceived reliability, aggregated positive and negative endorsements or votes from users or any other statistical information to assist a prospective consumer to assess the likelihood of successfully taking advantage of the promotional offer 605 or shopping tip 607 (or e.g. software update, patch or plug-in).

In some embodiments, the statistical information 630 may comprise a histogram 632 representative of the historical user votes received in relation to the particular promotional offer 605 or shopping tip 607. The histogram 632 may comprise a number of bars displayed in series and indicative of the number and value (positive and/or negative) of user votes on the perceived reliability or redeemability of the promotional offer 605 or shopping tip 607 over time.

Display portion 610 for promotional offers 605 may further comprise a Flash object 613, such as an empty Flash movie, that is transparent and overlaid on the promotional code 612. Alternatively, Flash object 613 may comprise one or more images that display the promotional code 612.

Feedback portion 620 comprises text 622 inviting feedback in relation to the promotional offer 605 or shopping tip 607 or other information item and positive and negative voting buttons 624, 626. Feedback portion 620 may also comprise a selectable link or button 628 to display previously posted user comments in relation to the information item and allow qualified users to post further feedback.

Selection of a positive or negative voting button 624, 626 triggers served JavaScript or other code executing in browser application 125 to transmit a message to server system 110 indicating the Boolean status of the vote (yes/positive or no/negative), the time and date and an identification of the promotional code 612 or other identifier of the information item that is the subject of the feedback. Instead of the feedback message comprising the time and date of the vote, server system 110 may record the time and date at which the feedback message is received at the server system 110. One or more servlets executing on server system 110 then parse the messages and record all of the voting information received in such messages as voting data in database 130.

The example display shown in FIG. 6 is ordered according to a ranking score associated with each information item that is determined as described in further detail below with reference to FIG. 5. Promotional offers 605, shopping tips 607 or other information items may be classified as being reliable or unreliable according to the ranking score. For example, information items having a positive ranking score (or otherwise being equal to or above a threshold level, such as zero or a mean or median ranking score, for example) may be considered to be reliable, while information items having a negative ranking score (or being below the threshold) may be grouped or classified as being unreliable, and these may be presented beneath a banner 608 indicating that the following items are considered to be unreliable. Alternatively, unreliable items may be displayed in a manner that visually distinguishes them from reliable items, such as colours, borders or other graphical distinctions. Reliability or unreliability is intended to be an indicator of the prospects of successful use, redemption or veracity of the presented information items.

Because the reliability of the information item is determined according to the ranking score, which does not directly equate to a ratio of positive to negative votes, an information item may have a relatively high success rate, but still be ranked as being unreliable. For example, promotional offer 605c is shown as having a 70% success rate, but it is grouped beneath banner 608 as being an unreliable information item. A clue as to why it is ranked as unreliable is evidenced from histogram 632 displayed for promotional offer 605c, which shows that recent votes received in relation to this information item have been negative. As described in further detail below with reference to FIG. 5, recency of votes affect a weighting to be attributed to the votes for determining the ranking score. As a contrasting example, promotional offer 605a is positioned above the dividing banner 608 between reliable and unreliable items. This histogram 632 of promotional offer 605a indicates many recent positive votes having been received in relation to that promotional offer, which in this case is consistent with the overall 73% success rate (i.e. 73% of the total votes have been positive).

Of the promotional offers 605 displayed in display 600, promotional offer 605a, 605b, 605c and 605d are displayed in descending order of ranking score. Additionally, shopping tips 607a and 607b happen to have ranking scores which position them intermediate promotional offers 605c and 605d. Shopping tips 607 are generally scored, ranked and voted on in the same manner as promotional offer 605, including providing statistical information 630 and histograms 632 indicating recent voting history. While shopping tips 607 display a selectable link 616 instead of a promotional code, this link 616 may direct the browser window 125 to a URL hosted by the server system 110 in the same manner as the selection of Flash object 613 as described above. Selection of link 616 would not, however, result in a copying of an offer or item code to the clipboard of the client computing device 120. In some embodiments, selectable links 616 may be used instead of Flash objects 613, for example where it is not desired to copy an item code to the clipboard, but to simply open a new display to an external URL as described below.

Referring also now to FIG. 7, display 700 is described in further detail. Display 700 is similar to display 600, in that the information items are displayed in descending order of ranking score, except that they are divided into separate display groups or categories within which they are ranked in descending order, independent of the other display groups or categories. For example, a number of information items may be featured in order to attract particular attention. In display 700, promotional offers 705a, 705b, 705c and 705d are displayed as featured offers within a featured item grouping 740. Within grouping 740, the promotional offers 705 are ranked according to ranking score and displayed in descending order of score. In the example display 700, statistical information section 630 does not show success rate or a histogram, although in other embodiments this information may be shown.

Item grouping 740 is positioned at the top of the information item listing, with a normal (non-featured) information item grouping 750 following thereafter. Item grouping 750 comprises promotional offers 705e and 705f, ranked in a similar manner to information items described above in relation to FIG. 6, and may comprise shopping tips 607, depending on the relative ranking scores. In the example display 700, promotional offer 705e has a higher ranking score than promotional offer 705f, even though it has a lower success rate. This is likely to be a result of promotional offer 705e having more recent positive votes, as indicated by histogram 632.

The number of items to be displayed within the first item grouping 740 may be configured to be limited to a maximum, in order to avoid featured items dominating the display to the exclusion of other items. For example, a limit of the top ranked four or five featured items may be displayed in item grouping 740, even though hundreds of such featured items may be identifiable in response to the received serve request. In the example display 700, any or all of promotional offers 705a, 705b, 705c and 705d may have a lower ranking score than the top promotional offers 705e and 705f of the second item grouping 750.

FIG. 8 illustrates a further example display 800 comprising information item 805 in the form of a promotional offer. Information item 805 is similar to the information items 605. 607 and 705 depicted in displays 600 and 700, in that it has a display portion 810 and a feedback portion 820. The display portion 810 is similar to display portion 610, in that it comprises a description 618 of the information item, in this case the promotional offer, and an item or promotional code 612 displayed under or as part of a Flash object 613. Display portion 810 has a modified statistical information section 830 comprising a modified histogram 832.

As is evident from feedback portion 820, only a single voting button 824 is provided instead of the two voting buttons 624, 626. This single voting button 824 is a positive voting button in FIG. 8, but in alternative embodiments may be a negative voting button. Thus, in some embodiments of system 100, the ranking score of information items may be determined based on only a single type of voting feedback. Such embodiments operate in a substantially identical manner to the embodiments employing both positive and negative voting, except that all information items will have a positive (or in some embodiments, negative) or zero ranking score. In such embodiments, the served page code is configured so that the information items are displayed in descending order of ranking score, as with the other embodiments.

In such embodiments, statistical information 830 may indicate a total number of votes received, displaying text such as "248 successful uses", for example, and having a histogram 832 that illustrates the recent history of successful uses (i.e. positive votes).

Figure 4:
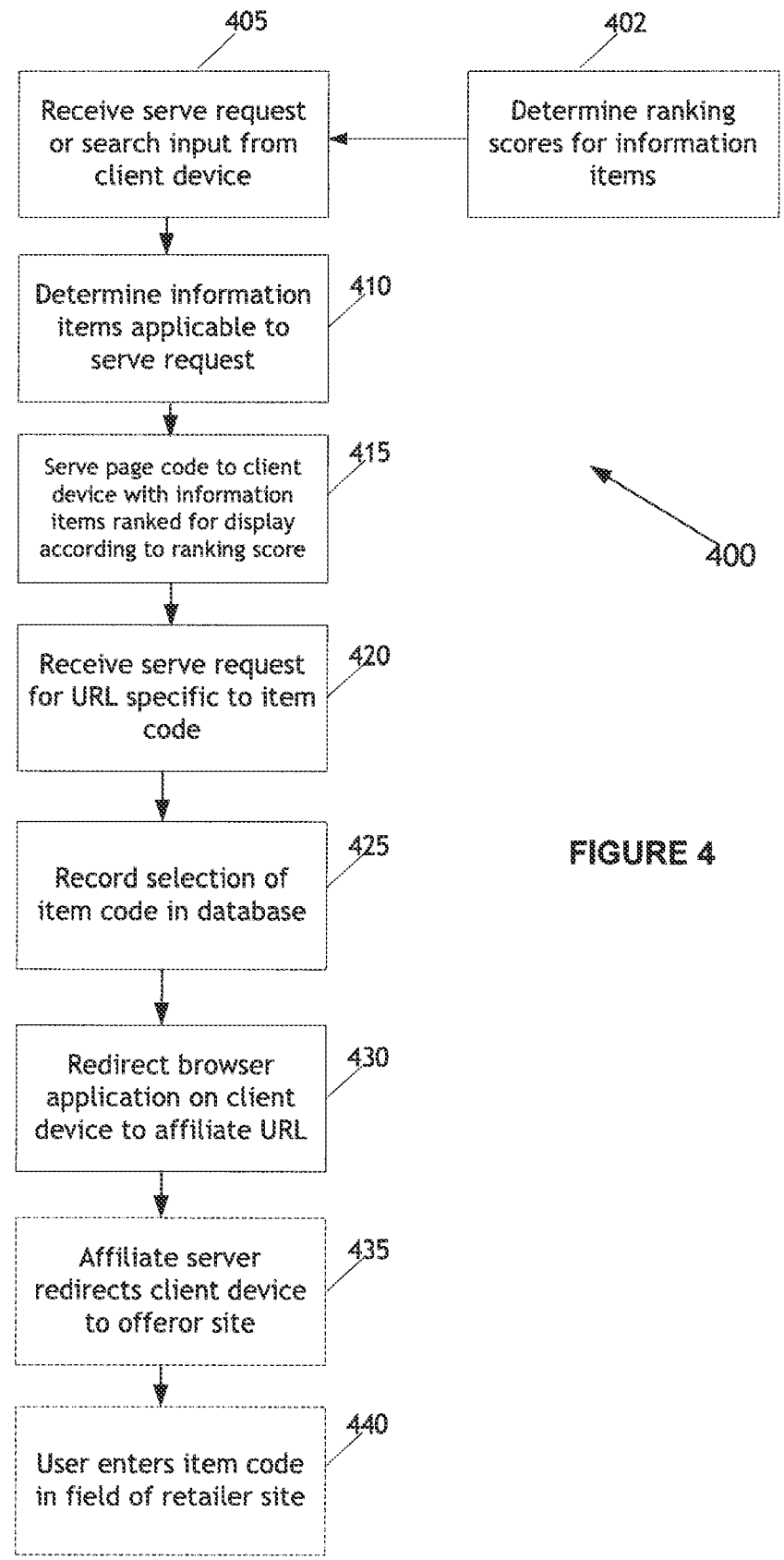
FIG. 4 is a flow chart of a method for displaying information items.

Referring now to FIG. 4, a method 400 for ranking promotional offers for display is described in further detail. Method 400 begins at step 402, at which the server system 110 determines ranking scores for the various stored information items. At step 405, server system 110 receives from client browser application 125 a page request (e.g. by specifying a URL hosted by server system 110 or by providing search or selection input) where the requested page comprises one or more information items such as a promotional offer 605 or multiple promotional offers 605. This serve request is sent via network 115.

At step 410, server system 110 queries the database 130 in response to the serve request to determine the information items applicable to one or more criteria provided with the serve request. If no search or selection-based criteria is specified in the search request, then a default criterion may be used. For example, if the serve request is directed to a general URL of the server system 110, there may be a default criterion applied to that URL such as "display top 20 information items with the highest ranking scores".

At step 415, in response to the serve request, server system 110 serves page code to client browser application 125 over network 115. The page code includes HTML code and applets and/or JavaScript to provide one or more displays, for example including display 600 or 700. This page code is then executed by the client browser application 125 to display images and/or text for one or more information items, such as promotional offers 605 or shopping tips 607, as part of display 600 or 700. The HTML code to provide one of the promotional offers 605 may have approximately the following form:

```
<div class="coupon" id="123456">
    ...
    <td class="code">FREE100</td>
    <td class="discount">Get Free Shipping off your
$100 Purchase</td>
    ...
</div>
```

Execution of the page code also inserts or embeds Flash object 613, e.g. <embed src="clicktocopy.swf?code=FREE100"/>. Voting buttons 624, 626 are embedded as selectable objects within display 600 or 700 which, when executed, cause execution of a script to provide a message containing voting information to be sent to server system 110.

As part of step 415, the page code served by server system 110 to client computing device 120 contains code to execute display of the information items in a particular order, with the information items to be displayed being those selected from the top results returned from the query of database 130 at step 410, ordered with the information item having the highest ranking score to be displayed at the top of the page, with the remaining information items being displayed in descending order. Alternatively, where there are two or more item groups, such as groups 740 and 750 illustrated in FIG. 7, the information item with the highest ranking score among the first group 740 is displayed at the top of the page, with the information item with the highest ranking from among the items in the second item grouping 750 being displayed just below the information item with the lowest score from among the first item grouping 740.

The page code served by server system 110 further comprises code to insert the unreliability banner 608 at an appropriate position within the information item listing, where there are unreliable information items to be displayed, such as in display 600. All information items to be displayed have a ranking score. An information item that has not received any votes is given the threshold reliability score, which may be zero, for example, so that an information item is not indicated as being unreliable until it has received at least one negative vote.

In response to serving the page code to client computing device 120, server system 110 may receive further serve requests specifying search or selection criteria to cause the display of further information items, in which case steps 405 to 415 are performed again for such serve requests. Alternatively, server system 110 may receive a serve request corresponding to selection of a link at the client computing device 120, for example if a user wishes to take advantage of the presented information item.

Once a link 616 or other linking object, such as Flash object 613 (displaying or overlying the promotional code 612), has been selected, an ActionScript code segment automatically copies the promotional code 612 (e.g. "FREE100"), if one is provided, to the clipboard or other user-accessible temporary storage of the client computing device 120. Simultaneously or immediately after the copying, client browser application 125 executes the ActionScript (or JavaScript called by the ActionScript) of Flash object 213 to open a new client browser window using the same client browser application 125. Alternatively, the ActionScript or JavaScript may cause a new browser display to be provided over the previous display instead of opening an entirely new window. This may be desirable where, for example, the client computing device 120 has a relatively small visual display area, such as for mobile handheld devices, that may become too crowded if more than one browser window is open.

The new client browser window or display is opened at step 420 with a URL (e.g. http://www.serversystemURL.com/out/?coupon=123456) passed to client device 120 with the page code, automatically directing the client browser application 125 to transmit a serve request to a URL hosted by server system 110. This URL may be specifically associated by server system 110 with the promotional code 612 or another identifier or code allocated by server system 110 to the information item and may include the promotional code 612 or other item code or identifier as part of the URL. Direction of the serve request to this specific URL allows the server system 110 to recognise that a link from the information item has been selected and to record this event at step 425 for tracking purposes.

As part of step 425, server 110 then performs a look-up, for example in database 130, to determine a special URL provided by an affiliate server 145 to enable tracking of traffic to the offeror server 140 via server system 110. The affiliate URL may not always be found by the look-up.

If the look-up is successful, then at step 430 server system 110 redirects the new client browser window or display in browser application 125 to the special affiliate URL hosted by the affiliate server 145, which may record the corresponding serve request as being associated with server system 110, so that acknowledgement or reward can be provided for the client referral through server system 110. If the affiliate URL cannot be found, a URL associated with offeror server 140 may be used instead.

Following step 430, affiliate server 145 automatically redirects the new window of the client browser application 125 to a suitable URL hosted by the offeror server 140, at step 435. The offeror server 140 may then serve page code to browser application 125 relating to the promotional offer or other information item or the product or service to which the selected information item relates. The redirections at steps 430 and 435 occur automatically without user input and may not be visible unless displayed by the browser application 125 in the http address field.

At the user's option, the user may directly paste the coupon code stored in the clipboard or other user accessible memory into a field on a page hosted by offeror server 140 to thereby claim or redeem the promotional offer, for example as part of an online purchase procedure. This pasting may be performed at step 440 using a suitable user interface feature provided by the client computing device 120, such as a key combination shortcut via a keyboard or via a drop down menu option, for example provided by the web browser application 125 or via a hot key or right click.

In alternative embodiments, step 420 may involve receipt of the serve request at an affiliate URL instead of the server system URL, thereby bypassing the client system 110 and sending the serve request directly to affiliate server 145. As the affiliate URL is a specific URL assigned for use by server system 110, this URL can be used by affiliate server 145 to track traffic referred through server system 110. In such alternative embodiments, steps 425 and 430 are not performed and the modified step 420 is followed by step 435.

Figure 5:
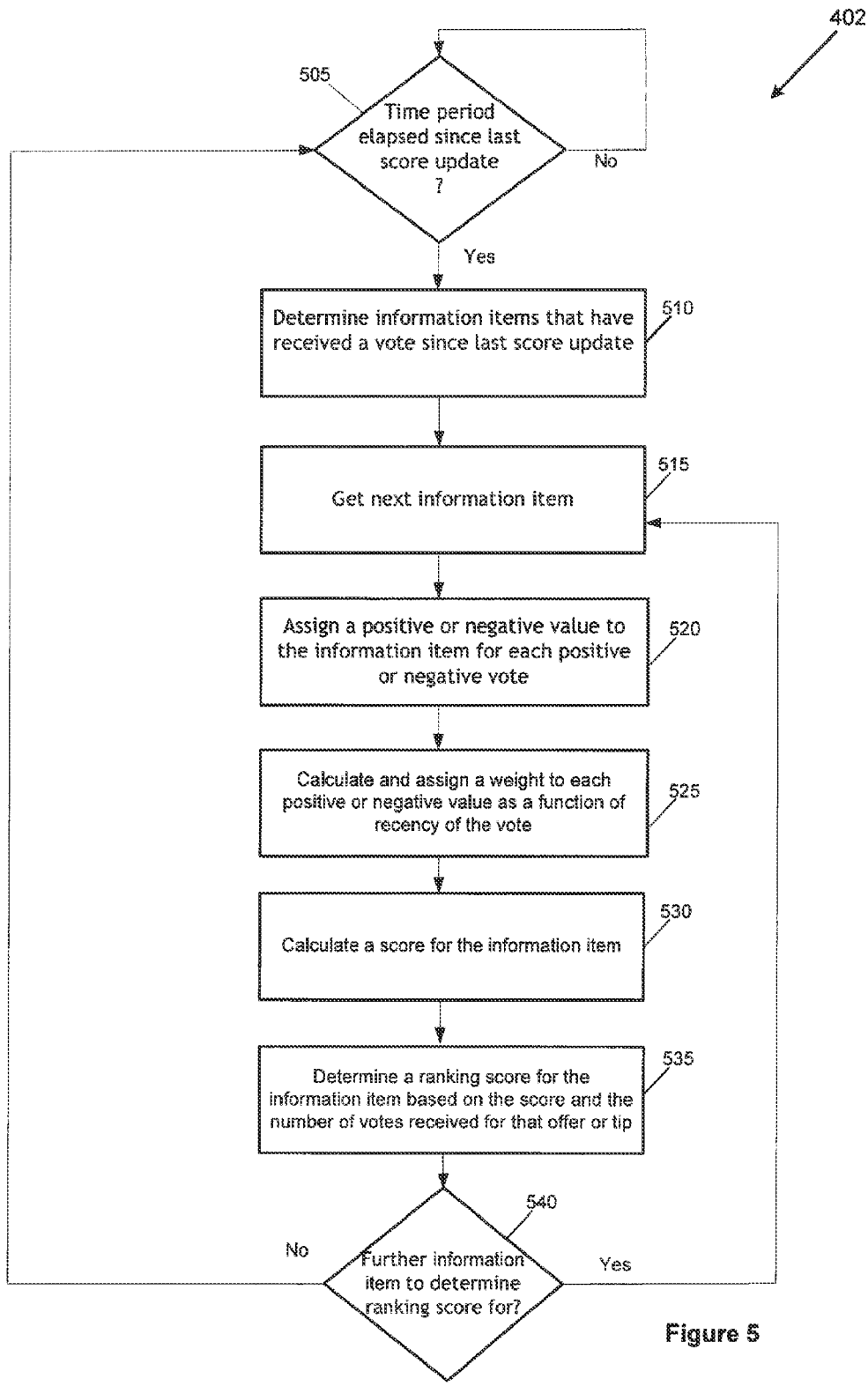
FIG. 5 is a flow chart of a method of determining a score for an information item based on user feedback.

Referring now to FIG. 5, a process performed according to step 402 of method 400 is described in further detail. The process begins, in some embodiments, at step 505, at which the ranking module checks a time elapsed since the last ranking score update. If the time period, which may be about 15 minutes or another fixed time period, has elapsed, then at step 510, the ranking module performs a query of database 130 to determine information items that have received a vote since the last score update. These information items will have had a flag set when a vote was first received in respect of that information item after the last score update. The query thus only needs to check for flagged information item records at step 510.

At step 515, the first (or next) information item is considered for updating of its ranking score assigns a numerical value to each negative ("N") and positive ("Y") vote received for the information item. Each positive vote counts as a +1, and that each negative vote counts as −1. This scoring scheme has the following advantages:

- It takes into account the fact that a negative vote "negates" the effect of a positive vote.
- It allows for the raw score, which will be a weighted average of the numerical value associated to each vote, to vary in a bounded region between −1 (corresponding to the instance in which all votes received were negative) and +1 (for the instance in which all votes received were positive).
- It allows a clear differentiation between a negative vote and no vote at all. While a more natural scoring of the votes may have been 0 and 1 for negative and positive scores respectively (which is the assumption underlying systems which depend on the proportion of positive scores), such a system does not fully take into account that a negative vote is worse than no vote at all in terms of assessing the effectiveness of the information item.

Finally, this scoring system suggests a very natural way of scoring new information items which would get an initial score of zero. In this way, new information items would start in a relatively high position, above all coupons that have proved to be ineffective (and thus have negative scores), but below "good" coupons (which would have positive scores).

At step 525, ranking module 154 assigns different weights to the +1 and −1 values, depending on how old the vote is. In particular, the value of each vote may be weighted using the following formula:

$$\text{Weight}(i, k) = \frac{1}{2^{Age(i,k)/AdjFactor}}$$

Where:
Weight(i,k) is the weight assigned to vote i for information item k,
Age(i,k) is an ageing function of vote i for information item k, and
AdjFactor is a constant chosen by administrators of server system 110 depending on how strong the decay effect is supposed to be. AdjFactor is exactly the same for all votes in the system.

AdjFactor is applied to the weighting formula such that lower values of this variable imply a stronger decay effect, which means that votes from the past have relatively less importance. Moreover, given the way in which AdjFactor is applied, AdjFactor can be interpreted as follows: "A vote received today (age 0) is equivalent to two votes received AdjFactor days ago". For example, if a vote 154 received today is desired to have the same value as two votes received 5 days ago, then ranking module may be configured to set AdjFactor=5. Alternatively, AdjFactor=1, this means that a vote received today is twice as important as a vote received yesterday, which would assume a relatively strong decay effect. On the other side of the spectrum, if AdjFactor tends to infinity, then weight(i) becomes 1 for all votes regardless of their age; which means that ranking module 154 would not take into account any decay effect at all. The following table illustrates the relative weights of votes given in the past for different values of AdjFactor.

TABLE 1

|  | AdjFactor = 1 | AdjFactor = Infinity | AdjFactor = 5 |
|---|---|---|---|
| Today | 1 | 1 | 1 |
| Yesterday | 0.50000 | 1 | 0.87055 |
| 2 days ago | 0.25000 | 1 | 0.75786 |
| 3 days ago | 0.12500 | 1 | 0.65975 |
| 4 days ago | 0.06250 | 1 | 0.57435 |
| 5 days ago | 0.03125 | 1 | 0.50000 |
| 6 days ago | 0.01563 | 1 | 0.43528 |
| 7 days ago | 0.00781 | 1 | 0.37893 |
| 8 days ago | 0.00391 | 1 | 0.32988 |
| 9 days ago | 0.00195 | 1 | 0.28717 |
| 10 days ago | 0.00098 | 1 | 0.25000 |

As can be seen from the example weights shown in Table 1, the suggested formula retains the interpretation for any pair of ages. For example, when AdjFactor=5, a vote today is twice as valuable as a vote 5 days ago; a vote yesterday is twice as valuable as a vote 6 days ago, etc.

At step 530, ranking module 154 determines a raw score for each information item as a weighted average of the +1's and the −1's coming from the positive and negative votes. The weights for this average are those computed at step 525. In order to keep this weighted average within the (−1, +1) range, the raw scored may be defined using the following formula:

$$RawScore(k) = \frac{1}{A(k)} \sum_{i=1}^{N(k)} Weight(i, k) * Value(i, k)$$

$$A(k) = \sum_{i=1}^{N} Weight(i, k)$$

Where:
RawScore(k) is the score assigned to information item k,
Weight(i,k) is the weight assigned to vote i for information item k, as computed in step 525,
Value(i,k) is an assigned value of vote i for information item k. This may be equal to 1 if the vote is positive, and −1 if the vote is negative.
N(k) is the number of votes received for information item k.

For example, let it be assumed that a particular information item received a total of 5 votes over the last 4 days (and assume that no other votes were received for this information item.) The first three votes were positive, and the last two were negative. Also assume that AdjFactor=5. This example information is presented in the following Table 2.

TABLE 2

| Vote | Age | Weight | Value |
|------|-----|--------|-------|
| 1 | 4 | 0.57435 | 1 |
| 2 | 4 | 0.57435 | 1 |
| 3 | 3 | 0.65975 | 1 |
| 4 | 0 | 1.00000 | −1 |
| 5 | 0 | 1.00000 | −1 |

Ranking module 154 may start by computing A(k), which is essentially the sum of the weights of all votes. Therefore, in this case, A(k)=0.57435+0.57435+0.65975+1+1=3.80845. Next, ranking module 154 computes the raw score for this information item. It would be:

$$RawScore(k) = \frac{1}{3.80845} \sum_{i=1}^{N(k)} Weight(i, k) * Value(i, k)$$

$$RawScore(k) =$$

$$\frac{1}{3.80845}(1*0.57435 + 1*0.57435 + (-1)*0.65975 + (-1)*1 + (-1)*$$

$$RawScore(k) = -0.05030$$

It is worthwhile to note how the "decay" effect introduces a very desirable feature: even though more positive than negative votes were received, the raw score is negative, because the negative votes have a stronger weight than the positive votes (because they were received more recently). Of course, the extent to which this happens can be adjusted by AdjFactor—it is possible that server system 110 may not want to treat 4-day old votes that differently from 0-day old ones. In that case, AdjFactor may be increased to any desired level.

Further, new information items (i.e., those without votes) can be assigned a neutral raw score of 0, for example, without conducting any calculations. This neutral raw score may be the reliability threshold value and may be a set value, such as zero, or may be a mean or median value of the ranking scores for all or some of the information items. This assignment of the threshold score to information items with no votes allows new information items to be ranked above unreliable or ineffective information items (thus giving the new information items a greater chance to become popular), while leaving the information items already established as effective (i.e., those with raw scores above the reliability threshold value) at the top of the ranking lists.

Ranking module 154 may, in some embodiments, make a final adjustment to the score at step 535 based on popularity of the information item, where "popularity" is defined as the number of votes received for an information item (either positive or negative). This would mean that "good" information items that have received a lot of attention (many votes) rank higher than other good information items that have received less attention (few votes). Similarly, "bad" information items that have received a lot of attention will be caused to rank lower than bad information items that have not received as much attention. This is because many votes for "bad" information items provide, in a sense, a confirmation that the information item is indeed bad; whereas a "bad" information item with relatively few votes could have been mistakenly classified as bad given the low amount of voters who gave their opinion about it.

Therefore, the formula for the final score can be defined as:

$$FinalScore(k) = RawScore(k) * N(k)$$

Where:
FinalScore(k) is the final score assigned to information item k;
RawScore(k) is the raw score assigned to information item k, as determined at step 530.
N(k) is the number of votes received by information item k.

The effect of these steps is that, when the information items are displayed, information items that have received many positive votes recently will tend to be at the top of the list; while information items that have received many negative votes recently will tend to be at the bottom. New information items will have a final score of zero, so they will appear in the list right below the good information items. In alternative embodiments, the final score may be determined as the product of the raw score with a number corresponding to the difference in the number of positive and negative votes.

At step 540, ranking module 154 determines whether there is a further information item for which an updated ranking score has not yet been calculated and, if so, repeats steps 515 to 535 for the next information item. Otherwise, process 402 returns to step 505 and the process 402 will be repeated again once the time period elapses again. The flags set for the information items that have had an updated ranking score calculated are reset or turned off after step 535.

In alternative embodiments, determination of ranking scores for information items may occur on-the-fly, so that as soon as a vote is received for an information item, its new ranking score is calculated based on all of the votes received for that information item. In such embodiments, steps 505 to 515 may be replaced by a step in which ranking module 154 determines that a vote has been received for a particular information item and then performs steps 520 to 535 for that information item.

In alternative embodiments, instead of an ageing function that is a number of days passed since the vote is received, a unit of time other than days may be employed. In further alternative embodiments, the ageing function may depend on a relative chronological order of receipt of the votes, rather than its absolute age. Thus, a most recent vote would have the same weight, no matter how old its absolute age is in days or other time units. For example, the most recent vote may have a weight of 1 while the second-most recent vote may have a vote of one-half and the $n^{th}$ most recent vote may have a weight of $$\frac{1}{n}.$$

As applied to the formula for determining the weight to be assigned to the positive or negative value, this latter chronological order-based ageing function may assign an age of ten to the tenth most recent vote, an age of five to the fifth most recent vote and an age of one to the first most recent vote.

In some embodiments, the magnitudes of the positive and negative values may be equal and may be one. In alternative embodiments, the magnitudes may be unequal and/or greater or less than one.

As described previously in relation to FIG. 8, some embodiments involve only allowing user feedback of positive (or in some embodiments negative) votes in relation to an information item. Such embodiments still employ the system architecture of system 100 described above and employ the methods and processes described above in relation to FIGS. 4 and 5. Specifically, in relation to performance of steps 520 and 525 described above, these steps are performed in the same manner for embodiments that employ only a single voting button, except that only one type of value can be assigned to the information item at step 520. In other words, if voting button 824 is a positive voting button, only positive values can be assigned to an information item 805 for the votes received in relation to that information item 805. Information items 805 have a ranking score determined according to the user voting feedback in a similar manner to information items 605, 607 and 705 and are displayed according to served page code in the same way as is described above in relation to displays 600 and 700.

In this description, the term "Flash object" or similar terms, is intended to indicate an electronic media object, for example having a .swf extension, according to the Adobe™ Flash specification. Additionally, the references to JavaScript and ActionScript are intended to be understood as examples of client-side script executable in a browser application and are not intended to be limiting. Other scripting languages may be used, to the extent that they are capable of performing the functions described herein. Embodiments are described herein by way of example, with reference to the drawings. The embodiments are intended to be provided by way of non-limiting example and some modifications of the described embodiments may be apparent to those of ordinary skill in the art without departing from the spirit and scope of the embodiments.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

What is claimed is:

1. A computer-implemented method of displaying promotional offers regarding goods and/or services, the method comprising:

a server system determining a ranking score for each of a plurality of promotional offers for purchase of items and/or services based on a history of positive or negative votes and on a number of votes received for each of the promotional offers, the determining comprising:

assigning a positive or negative value to a promotional offer for purchase of an item and/or service for each respective positive or negative vote, and assigning a weight to each positive or negative value as a function of how recent was the respective positive or negative vote, and calculating a score for each promotional offer assigned a value, the score being calculated as a first sum across all votes of the product of the value of each vote with its assigned weight, divided by a second sum of the weights across all votes; and calculating the ranking score each of the plurality of promotional offers as a product of the calculated score for each promotional offer and the number of votes received for each promotional offer;

the server system determining, responsive to a first serve request and based on at least one criterion, at least one of the promotional offers to be displayed at a client device;

the server system transmitting to the client device code executable by a browser application to display the at least one promotional offers based on the ranking score; and receiving at the server system associated with a host site a second serve request indicating a first uniform resource locator (URL) unique to one promotional offer described in the code transmitted to the client device; and automatically redirecting the second serve request to a second URL associated with an offeror of the one promotional offer at a second host site, the second URL being unique to the first host site and the offeror of the one promotional offer associated with the second host site.

2. The method of claim 1, wherein the recency of a vote is determined according to a time elapsed since the vote was received.

3. The method of claim 1, wherein the recency of a vote is determined according to a relative chronological order in which votes are received.

4. The method of claim 1, further comprising receiving voting information for each received vote and storing in a database voting data based on the voting information in a data record associated with the promotional offers.

5. The method of claim 4, wherein the voting data comprises for each vote a Boolean value and a date and time at which the vote was received.

6. The method of claim 1, wherein the determining a display ranking is performed at regular intervals.

7. The method of claim 1, wherein the determining a display ranking comprises assigning a neutral ranking score to each promotional offer that has not received any votes.

8. The method of claim 1, wherein the at least one criterion comprises a criterion or selection input received from the client device with the first serve request.

9. The method of claim 1, wherein the at least one criterion comprises a default display criterion.

10. The method of claim 1, further comprising performing a look-up based on the first URL to determine the second URL.

11. The method of claim 1, further comprising storing a record of the receiving of the second serve request.

12. The method of claim 1, wherein the assigned weighting for each value is proportional to the recency of the vote.

13. The method of claim 1, wherein the determining a display ranking further comprises applying a predetermined adjustment factor to determine the weighting to be assigned to each value.

14. The method of claim 13, wherein the adjustment factor is configurable to increase or reduce the effect that recency has on the weights assigned to the values.

15. The method of claim 1, wherein the assigned weight is calculated according to $$\frac{1}{2^{Age(i,k)/AdjFactor}}$$

Where:
Weight(i,k) is the weight assigned to vote i for promotional offer k, Age(i,k) is an aging function of vote i for promotional offer k, and AdjFactor is a constant.

16. The method of claim 15, wherein the ageing function is a number of time units since vote i was received for promotional offer k.

17. The method of claim 15, wherein the ageing function is inversely proportional to the chronological order in which vote i was received from promotional offer k, wherein the ageing function assigns to a most recent vote a lowest value and assigns to an oldest vote a highest value.

18. The method of claim 15, wherein the score is calculated according to the formula:

$$Score(k) = \frac{1}{A(k)} \sum_{i=1}^{N(k)} Weight(i,k) * Value(i,k)$$

Where:

$$A(k) = \sum_{i=1}^{N} Weight(i,k)$$

Score(k) is the score assigned to information item k,
Weight(i,k) is the weight assigned to vote i for information item k,
Value(i,k) is an assigned value of vote i for information item k, and
N(k) is the number of votes received information item k.

19. The method of claim 18, wherein the ranking score for each promotional offer is the score calculated for that promotional offer.

20. The method of claim 18, wherein the ranking score for each promotional offer is the product of the number of votes received for that promotional offer with the score calculated for that promotional offer.

21. The method of claim 1, wherein the positive value and the negative value have a same magnitude.

22. The method of claim 1, wherein the promotional offers comprise at least one of promotional offers and shopping tips.

23. A method of displaying promotional offers regarding goods and/or services, the method comprising:
a server system determining a ranking score for each of a plurality of promotional offers regarding goods and/or services based on a history of votes and on a number of votes received for each of the promotional offers, the determining comprising:
assigning a value to a promotional offer for each vote received in respect of that promotional offer, the score being calculated as a first sum across all votes of the product of the value of each vote with its assigned weight, divided by a second sum of the weights across all votes; and
calculating a product of the score and the number of votes received for each promotional offer;
the server system determining, responsive to a first serve request and based on at least one criterion, at least one of the promotional offers to be displayed at a client device;
the server system transmitting to the client device code executable by a browser application to display the at least one promotional offer based on the ranking score; and
receiving at the server system associated with a host site a second serve request indicating a first uniform resource locator (URL) unique to one promotional offer described in the code transmitted to the client device; and
automatically redirecting the second serve request to a second URL associated with an offeror of the one promotional offer, at a second host site, the second URL being unique to the first host site and the offeror of the one promotional offer associated with the second host site.

24. Computer-readable non-transitory storage storing executable program code which, when executed by at least one processor, causes the at least one processor to perform a process comprising:
determining a ranking score for each of a plurality of promotional offers based on a history of positive or negative votes and on a number of votes received for each of the promotional offers regarding goods and/or services, the determining comprising:
assigning a positive or negative value to a promotional offer regarding a goods and/or services for each respective positive or negative vote, assigning a weight to each positive or negative value as a function of recency of the respective positive or negative vote, and calculating a score for each promotional offer, the score being calculated as a first sum across all votes of the product of the value of each vote with its assigned weight, divided by a second sum of the weights across all votes; and
calculating a product of the score and the number of votes received for each promotional offer;
determining, responsive to a first serve request and based on at least one criterion, at least one of promotional offers to be displayed at a client device;
transmitting to the client device code executable by a browser application to display the at least one promotional offer based on the ranking score;
receiving at a host site a second serve request indicating a first uniform resource locator (URL) unique to one promotional offer described in the code transmitted to the client device; and automatically redirecting the second serve request to a second URL associated with an offeror of the one promotional offer at, a second host site, the second URL being unique to the first host site and the offeror associated with the second host site.

25. A server system comprising:

at least one processing device; and computer-readable storage storing executable instructions which, when executed by the at least one processing device, cause the server system to perform acts of:

determining a ranking score for each of a plurality of promotional offer based on a history of positive or negative votes and on a number of votes received for each of the promotional offers regarding goods and/or services, the determining comprising:

assigning a positive or negative value to a promotional for each respective positive or negative vote, assigning a weight to each positive or negative value as a function of the recency of the respective positive or negative vote, and calculating a score for each promotional offer, the score being calculated as a first sum across all votes of the product of the value of each vote with its assigned weight, divided by a second sum of the weights across all votes; and calculating a product of the score and the number of votes received for each promotional offer;

determining, responsive to a first serve request and based on at least one criterion, at least one of the promotional offers to be displayed at a client device;

transmitting to the client device code executable by a browser application to display the at least one promotional offer based on the ranking score;

receiving at a host site a second serve request indicating a first uniform resource locator (URL) unique to one promotional offer described in the code transmitted to the client device; and automatically redirecting the second serve request to a second URL associated with an offeror of the one promotional offer, at a second host site, the second URL being unique to the first host site and the offeror of the one promotional offer associated with the second host site.

\* \* \* \* \*